United States Patent
Satzinger et al.

(10) Patent No.: US 12,182,660 B2
(45) Date of Patent: *Dec. 31, 2024

(54) MULTI-STATE QUBIT READOUT WITH PERMUTATION SEQUENCES

(71) Applicant: Google LLC, Mountain View, CA (US)

(72) Inventors: Kevin Joseph Satzinger, Goleta, CA (US); Julian Shaw Kelly, Santa Barbara, CA (US); Paul Victor Klimov, Santa Barbara, CA (US); Alexander Nikolaevich Korotkov, Riverside, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,758

(22) Filed: Oct. 10, 2023

(65) Prior Publication Data
US 2024/0119326 A1    Apr. 11, 2024

Related U.S. Application Data

(63) Continuation of application No. 17/109,448, filed on Dec. 2, 2020, now Pat. No. 11,816,535.

(60) Provisional application No. 62/948,365, filed on Dec. 16, 2019, provisional application No. 62/942,946, filed on Dec. 3, 2019.

(51) Int. Cl.
| | |
|---|---|
| *G06N 10/00* | (2022.01) |
| *B82Y 10/00* | (2011.01) |
| *G06F 15/16* | (2006.01) |

(52) U.S. Cl.
CPC .............. *G06N 10/00* (2019.01); *B82Y 10/00* (2013.01); *G06F 15/16* (2013.01)

(58) Field of Classification Search
CPC ........ G06N 10/00; G06N 10/60; G06N 10/70; G06N 10/20; B82Y 10/00; G06F 15/16
See application file for complete search history.

(56) References Cited

U.S. PATENT DOCUMENTS

| | | |
|---|---|---|
| 8,510,618 B1 | 8/2013 | Pesetski et al. |
| 10,726,351 B1 | 7/2020 | Li et al. |
| 2015/0358022 A1 | 12/2015 | McDermott, III et al. |
| 2018/0260732 A1 | 9/2018 | Bloom et al. |
| 2019/0251478 A1 | 8/2019 | Bishop et al. |
| 2020/0169396 A1 | 5/2020 | Neven et al. |

(Continued)

*Primary Examiner* — Nha T Nguyen
(74) *Attorney, Agent, or Firm* — DORITY & MANNING P.A.

(57) ABSTRACT

Systems and methods for measuring quantum states of qubits with more than two levels are provided. A method can include, for a plurality of shuffling sequences, applying, by a quantum computer, one or more quantum gates to the one or more qubits to execute a quantum algorithm; applying, by the quantum computer, a shuffling sequence to the one or more qubits; and measuring, using a readout apparatus, the state of the one or more qubits to determine a readout state. The method can further include determining, by a classical computer or the quantum computer, an average occupation for one or more of the quantum states of the one or more qubits using the readout states for each of the shuffling sequences. The readout states can correspond to a state in a subset of the quantum states of the one or more qubits.

20 Claims, 6 Drawing Sheets

(56) References Cited

U.S. PATENT DOCUMENTS

| | | |
|---|---|---|
| 2020/0201379 A1 | 7/2020 | Hogaboam et al. |
| 2020/0310908 A1* | 10/2020 | Hogaboam ............. G06F 11/10 |
| 2020/0401922 A1 | 12/2020 | Clarke |
| 2020/0410381 A1 | 12/2020 | Khan et al. |
| 2021/0049482 A1 | 2/2021 | Mezzacapo et al. |
| 2021/0150403 A1 | 5/2021 | Grigoryan et al. |
| 2022/0253649 A1 | 8/2022 | Khan et al. |

\* cited by examiner

MULTI-STATE QUBIT READOUT WITH PERMUTATION SEQUENCES

PRIORITY CLAIM

The present application is a continuation of U.S. application Ser. No. 17/109,448 having a filing date of Dec. 2, 2020 which claims filing benefit of U.S. Provisional Patent Application Ser. No. 62/942,946 having a filing date of Dec. 3, 2019 and U.S. Provisional Patent Application Ser. No. 62/948,365 having a filing date of Dec. 16, 2019. Applicant claims priority to and the benefit of each of such applications and incorporate all such applications herein by reference in its entirety.

FIELD

This disclosure relates to measuring quantum states of qubits with more than two levels.

BACKGROUND

Quantum computers are computing devices that exploit quantum superposition and entanglement to solve certain types of problem faster than a classical computer. The building blocks of a quantum computer are qubits. Ideally, qubits are two level systems whose state can be in a superposition of its two states, $|0\rangle$ and $|1\rangle$, rather than just in either of the two states as is the case for a classical bit.

In practice, physical qubits often have additional non-computational states that lie outside the computational subspace (i.e. states other than $|0\rangle$ and $|1\rangle$). Leakage into these non-computational states can be problematic and result in errors when executing a quantum algorithm.

SUMMARY

Aspects and advantages of embodiments of the present disclosure will be set forth in part in the following description, or can be learned from the description, or can be learned through practice of the embodiments.

According to one aspect, this specification discloses a method for determining average occupation of quantum states of one or more qubits in a quantum computer, each qubit comprising three or more quantum states. For each of a plurality of shuffling sequences, the method comprises: applying, by the quantum computer, one or more quantum gates to the one or more qubits to execute a quantum algorithm; applying, by the quantum computer, a shuffling sequence to the one or more qubits; and measuring, using a readout apparatus, the state of the one or more qubits to determine a readout state. The method further comprises determining, by a classical computer or the quantum computer, an average occupation for one or more of the quantum states of the one or more qubits using the readout states for each of the shuffling sequences. The readout states each correspond to a state in a subset of the quantum states of the one or more qubits. The plurality of shuffling sequences comprises one or more sequences for exchanging the population of two or more quantum states in the one or more qubits.

The plurality of shuffling sequences may comprise an identity sequence. The readout states may each correspond to a state in a computational subspace.

The method may further comprise determining, by the classical computer or the quantum computer, leakage from computational states of the one or more qubits to non-computational states of the one or more qubits using the average occupation for each of one or more of the quantum states. The method may further comprise adjusting, based on the determined leakage, control parameters of the one or more quantum gates to reduce leakage from computational states of the one or more qubits to non-computational states of the one or more qubits.

The method may further comprise: preparing the one or more qubits in a known quantum state; measuring, using a readout apparatus, the state of the one or more qubits to determine a calibration readout state; and determining, by the classical computer or the quantum computer, calibration values based on the calibration readout state. Determining an average occupation for one or more of the quantum states of the one or more qubits may further be based on the calibration values. For each of a plurality of shuffling sequences, the method may further comprise: preparing the one or more qubits in a known quantum state; applying, by the quantum computer, a shuffling sequence to the one or more qubits; measuring, using a readout apparatus, the state of the one or more qubits to determine a further calibration readout state. Determining the calibration values may further be based on the further calibration values. Determining an average occupation for one or more of the quantum states of the one or more qubits may comprise the use of a least squares method or a maximum likelihood method.

Applying, by the quantum computer, a shuffling sequence to the one or more qubits may comprise applying one or more microwave pulses to the one or more qubits. The one or more microwave pulses may each exchange amplitudes of neighbouring quantum states of the one or more qubits.

According to a further aspect, this specification discloses a system comprising: one or more qubits, each qubit comprising three or more quantum states; control apparatus configured to apply one or more quantum gates to the one or more qubits to execute a quantum algorithm and to apply one or more shuffling sequences to the one or more qubits to exchange the population of two or more quantum states in the one or more qubits; readout apparatus configured to measure a state of the one or more qubits, the readout apparatus providing a readout state corresponding to a state in a subset of the quantum states of the one or more qubits. The system is configured to, for each of a plurality of shuffling sequences: apply, by the control apparatus, one or more quantum gates to the one or more qubits to execute the quantum algorithm; apply, by the control apparatus, a shuffling sequence to the one or more qubits; and measure, using the readout apparatus, the state of the one or more qubits to determine a readout state. The system is further configured to determine an average occupation for one or more of the quantum states of the one or more qubits using the readout states for each of the shuffling sequences.

The plurality of shuffling sequences may comprise an identity sequence. The readout states may each correspond to a state in a computational subspace.

The system may be further configured to determine leakage from computational states of the one or more qubits to non-computational states of the one or more qubits using the average occupation for each of one or more of the quantum states. The system may be further configured to adjust, based on the determined leakage, one or more control parameters of the one or more quantum gates to reduce leakage from computational states of the one or more qubits to non-computational states of the one or more qubits.

The system may be further configured to: prepare the one or more qubits in a known quantum state; measure, using a readout apparatus, the state of the one or more qubits to determine a calibration readout state; and determine one or more calibration values based on the calibration readout states. Determining an average occupation for one or more of the quantum states of the one or more qubits may be further based on the one or more calibration values. The system may be further configured to, for each of a plurality of shuffling sequences: prepare the one or more qubits in a known quantum state; apply, by the quantum computer, a shuffling sequence to the one or more qubits; and measure, using a readout apparatus, the state of the one or more qubits to determine a respective further calibration readout state. Determining the one or more calibration values may be further based on the further calibration readout states. Determining an average occupation for one or more of the quantum states of the one or more qubits may comprise the use of a least squares method or a maximum likelihood method.

Applying, by the control apparatus, a shuffling sequence to the one or more qubits may comprise applying one or more microwave pulses to the one or more qubits. The one or more microwave pulses may each exchange one or more amplitudes of neighbouring quantum states of the one or more qubits.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Quantum computing is usually formulated in terms of ideal two-level systems, called qubits. The two levels used in quantum computations are canonically denoted $|0\rangle$ and $|1\rangle$, and are together called the computational states and said to form a computational subspace.

However, physical realisations of qubits often have additional states, known as non-computational states, which are said to form a non-computational subspace. These are often higher energy levels of the physical system being used as a qubit, such as the $|2\rangle$, $|3\rangle$ etc. states. During the implementation of a quantum algorithm, leakage into these states from the computational states can be problematic and result in errors when executing the quantum algorithm. This leakage is, however, difficult to avoid, especially in weakly non-linear qubit systems, such as transmons. Moreover, non-computational states may be used in some implementations of quantum gates to execute a particular operation of the computational subspace. Leakage may occur during the execution of such quantum gates.

Minimising leakage is an important design consideration when making an accurate quantum computer. However, tuning parameters of the quantum computer to minimise leakage requires that the population of non-computational states after executing an algorithm be known in order to determine the leakage. In practice, the populations of non-computational states are difficult to determine using readout apparatus that is used for measuring states in the computational subspace; often the readout apparatus, while capable of distinguishing between states in the computational subspace, cannot easily discriminate between a state in the non-computational subspace and a state in the computational subspace.

Instead of measuring the populations of the non-computational states directly, the systems and methods disclosed herein use readout apparatus that can only distinguish between a subset of the available states of the physical qubit, and apply shuffling sequences of control pulses to qubits in order to exchange the populations of states in the qubits before measurement. The readouts from the readout apparatus from these shuffled states can collectively be used to determine the populations of the states of the qubits.

Figure 1:
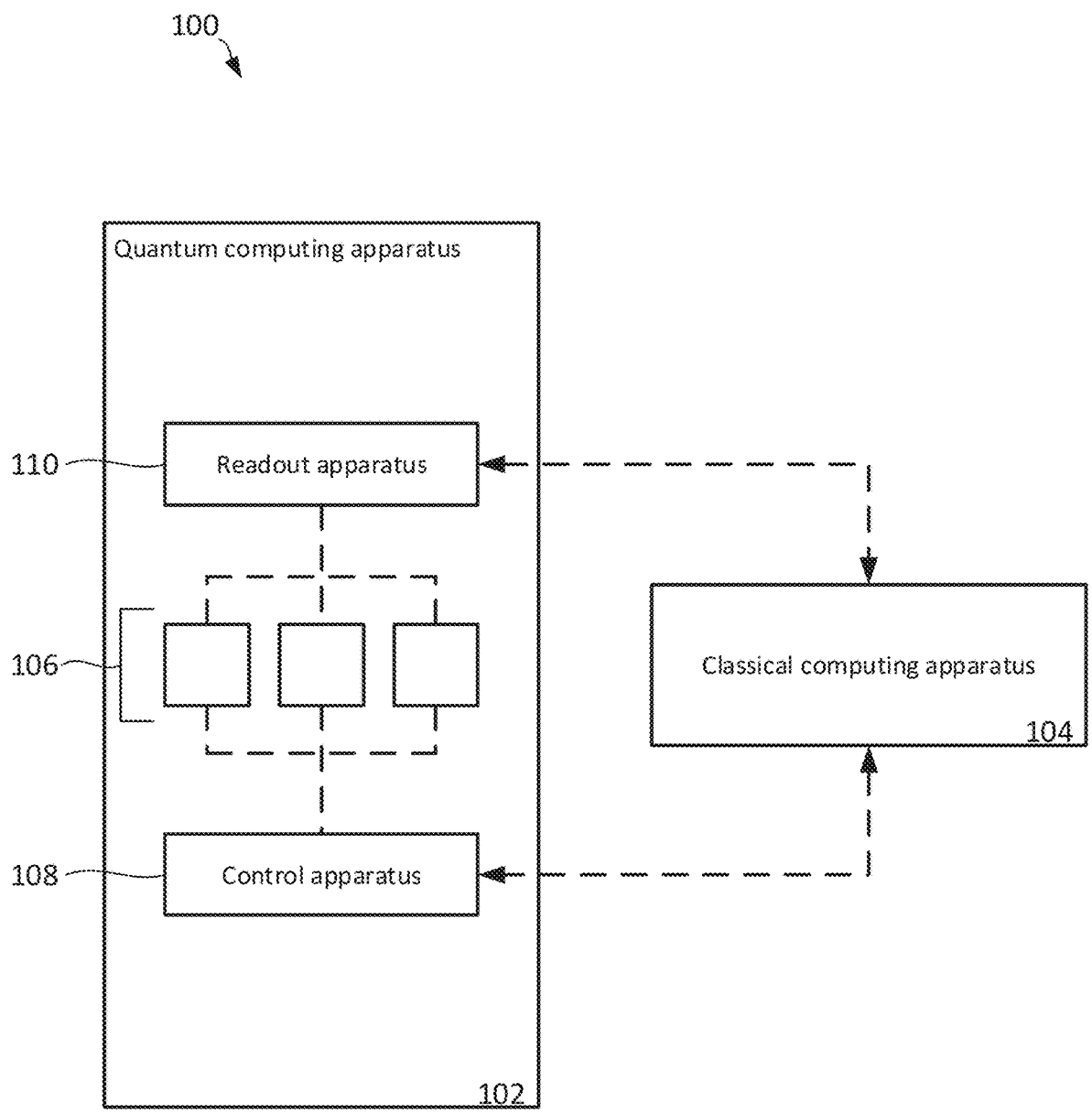
FIG. 1 shows an overview of an exemplary quantum computing system.

FIG. 1 shows an overview of an exemplary quantum computing system 100. The system comprises quantum computing hardware 102 and classical computing hardware 104.

The quantum computing hardware 102 comprises one or more physical qubits 106. In the example shown, three qubits 106 are present, though greater or fewer qubits can be used. Each physical qubit 106 is a physical system with three or more quantum levels. Two of the quantum levels are taken to form the computational subspace, i.e. the states $|0\rangle$ and $|1\rangle$. These may, in some implementations, be the lowest two energy states of the physical system being used as a qubit. The remaining one or more states form the non-computational subspace, i.e. $|2\rangle$, $|3\rangle$ etc.

In some implementations, the one or more qubits 106 may be superconducting qubits. For example, the one or more qubits 106 may be transmon or fluxmon qubits. In other implementations other qubit architectures may be used instead, such as a system based on one or more ion traps, quantum dots, neutral atoms, Rydberg states, solid-state defects, molecules, or photons.

The quantum computer further comprises control apparatus 108. The control apparatus 108 is configured to apply control signals to the qubits 106 in order to alter properties of the qubits. For example, the control apparatus 108 can apply control signals to the qubits 106 in order to implement one or more quantum gates on the qubits 106. The control apparatus 108 may comprise one or more control lines for transmitting control signals to the one or more qubits 106.

The control signals may, for example, comprise control pulses for altering states on the one or more qubits 106. Such control pulses may be in the form of microwave control pulses. An example of such a microwave control pulse is a n-pulse, which acts to exchange the amplitudes (and hence the populations) of quantum states in the one or more qubits 106.

The quantum computer further comprises readout apparatus 110. The readout apparatus 110 is configured to perform measurements on the one or more qubits 106. Based on the results of the measurements, the readout apparatus 110 provides output indicative of the state of the one or more qubits 106. For example, in a single qubit system, the readout apparatus 110 may provide an output of "0" or "1" corresponding to the |0> and |1> states of the qubit respectively. As another example, in a two qubit system, the readout apparatus 110 may provide an output of "00", "01", "10", or "11" corresponding to the |00>, |01>, |10> and |11> states of the qubit respectively.

The readout apparatus 110 is limited to providing output indicative of a subset of the total available states of the one or more qubits 106. Qubit states outside this subset will be measured by the readout apparatus as being in one or more of the states in the subset with some probability. For example, the readout apparatus 110 may be limited to provide output indicative of states being in the computational subspace, as in the examples provided in the previous paragraph in relation to the single and two qubit systems. In such an example, when measuring states outside the computational subspace, the readout apparatus 110 will indicate these states as being within the computational subspace.

In the implementation shown, the readout apparatus 110 is a separate component to the control apparatus 106. However, in other implementations the readout apparatus 110 may be a part of the control apparatus 108.

The classical computing 104 apparatus may interact with the control apparatus 108 to control operation of the control apparatus 108. For example, a user interface for the control apparatus 104 may be provided through the classical computing apparatus 104. The classical computing apparatus 104 may also process measurement data/readout states from the readout apparatus 110 to determine the average population of the quantum states and/or calibration values for the system 100.

Figure 2A:
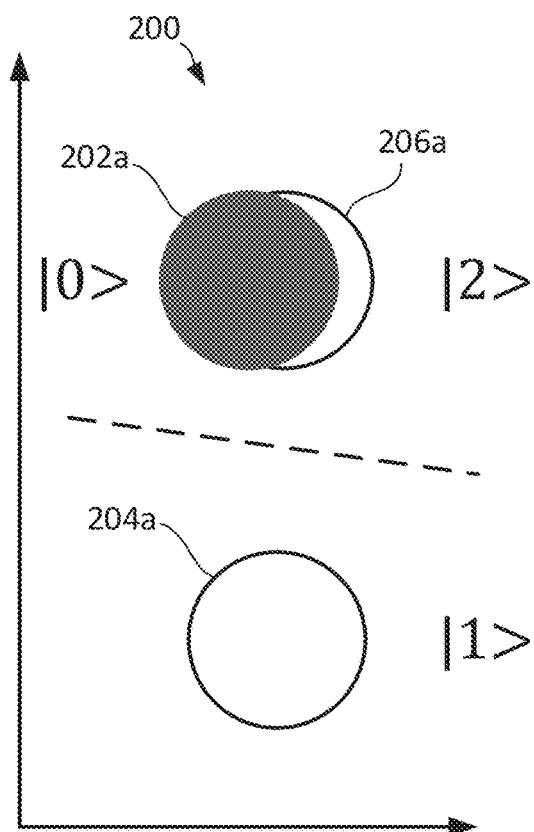
FIG. 2a shows a schematic illustration of single qubit states in a "measurement space"
Figure 2B:
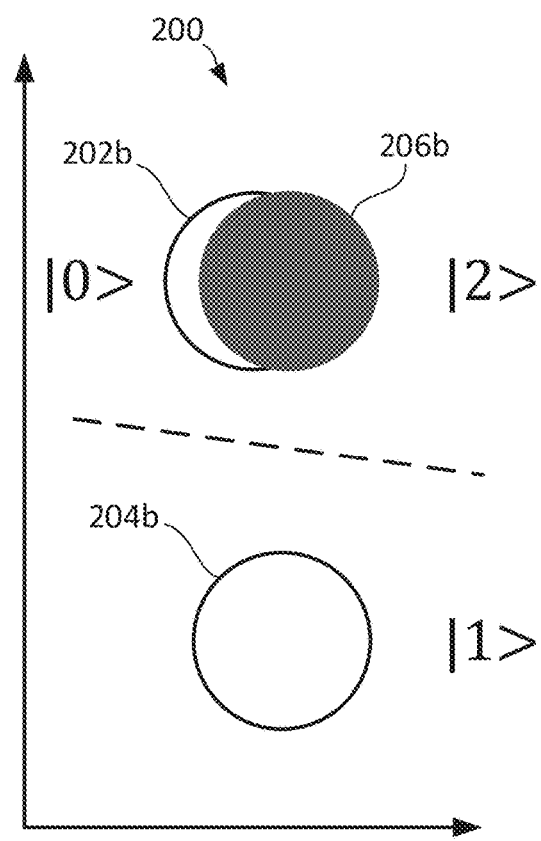
FIG. 2b shows a schematic illustration of single qubit states in a "measurement space"

FIGS. 2a and 2b show schematic illustrations of single qubit states in a "measurement space" 200. As used herein, the term measurement space is used to refer to the set of measurements of physical properties that the readout apparatus 110 can obtain. The measurements may, for example, be voltages of control lines, readout pulse shapes, readout frequencies. In some implementations, the measurements are readouts from I and Q ports of an I/Q mixer. The measurement space then corresponds to the I-Q plane.

In the example shown, the qubit is a three level system having three states, |0>, |1>, and |2>. In FIG. 2a, the |0> state of the qubit is occupied. In FIG. 2b, the |2> state of the qubit is occupied. The readout apparatus in the example is only capable of outputting a computational basis state as a measurement—i.e. when the system is in the |2> state, the readout apparatus will output data indicating that the qubit is in the |0> or |1> state with some probability. In other words, the readout apparatus 110 cannot provide an output reading indicating a non-computational basis state. However, in general the readout apparatus is unable to distinguish between two or more of the states of the qubit, which may include states outside of the computational subspace (e.g. the readout apparatus may be able to provide output indicating states |0>, |1>, and |2>, but not states |3> or higher). In the example shown, only three qubit states are shown, though a greater number of quantum states may be present.

The state |0> is associated with a first set of measurements 202a, 202b. The first set of measurements 202a, 202b is the set of physical measurements that the readout apparatus could obtain when measuring the qubit if it is in state |0>. The state |1> is associated with a second set of measurements 204a, 204b. The second set of measurements 204a, 204b is the set of physical measurements that the readout apparatus could obtain when measuring the qubit if it is in state |1>. Each set of measurements may also be referred to as a "measurement cloud" and define boundaries of states in measurement space.

In the example shown, the first set of measurements 202a, 202b and the second set of measurement 204a, 204b are disjoint. The readout apparatus 110 can therefore distinguish between measurements corresponding to the |0> state and measurements corresponding to the |1> state.

The state |2> is associated with a third set of measurements 206a, 206b. The third set of measurements 206a, 206b is the set of physical measurements that the readout apparatus could obtain when measuring the qubit if it is in state |2>. In the example shown, the third set of measurements 206a, 206b overlaps with the first set of measurements 202a, 202b. The readout apparatus 110 therefore cannot distinguish between measurements corresponding to the |0> state and measurements corresponding to the |2> state.

For example, in FIG. 2a the qubit is in the |0> state. The readout apparatus 110 measures properties of the qubit and the resulting measurements lie within the first set of measurements 202a. The readout apparatus 110 correctly indicates that the qubit is in state |0>, e.g. provides a "0" output. In FIG. 2b, the qubit is in the |2> state. The readout apparatus 110 measures properties of the qubit and obtains measurements that lie within the third set of measurements 206b. However, the obtained measurements also lie within the first set of measurements 202b. The readout apparatus 110 erroneously indicates that the qubit is in the |0> state, e.g. provides a "0" output. That is, the readout apparatus is unable to distinguish between the |0> state and the |2> state.

In the example shown, the third set of measurements 206a, 206b is disjoint from the second set of measurements 204a, 204b. However, the third set of measurements 206a, 206b may alternatively or additionally overlap with the second set of measurements 204a, 204b. In implementations where the third set of measurements 206a, 206b overlaps with both the first 202a, 202b and second 204a, 204b sets of measurements, if the system is in the |2> state, then the readout apparatus 110 may provide output indicative of either the |0> state or the |1> state (e.g. provides a "0" or "1" output) with some fixed probability.

It should be noted that even if the third set of measurements 206a, 206b does not overlap with either of first 202a, 202b or second 204a, 204b sets of measurements, the readout apparatus may still interpret measurements corresponding to the |2> state as being either the |0> state or |1> state with some fixed probability. In general, the readout apparatus can only indicate that the system is in one of a subset of the available states of the qubit.

Figures 3A, 3B:
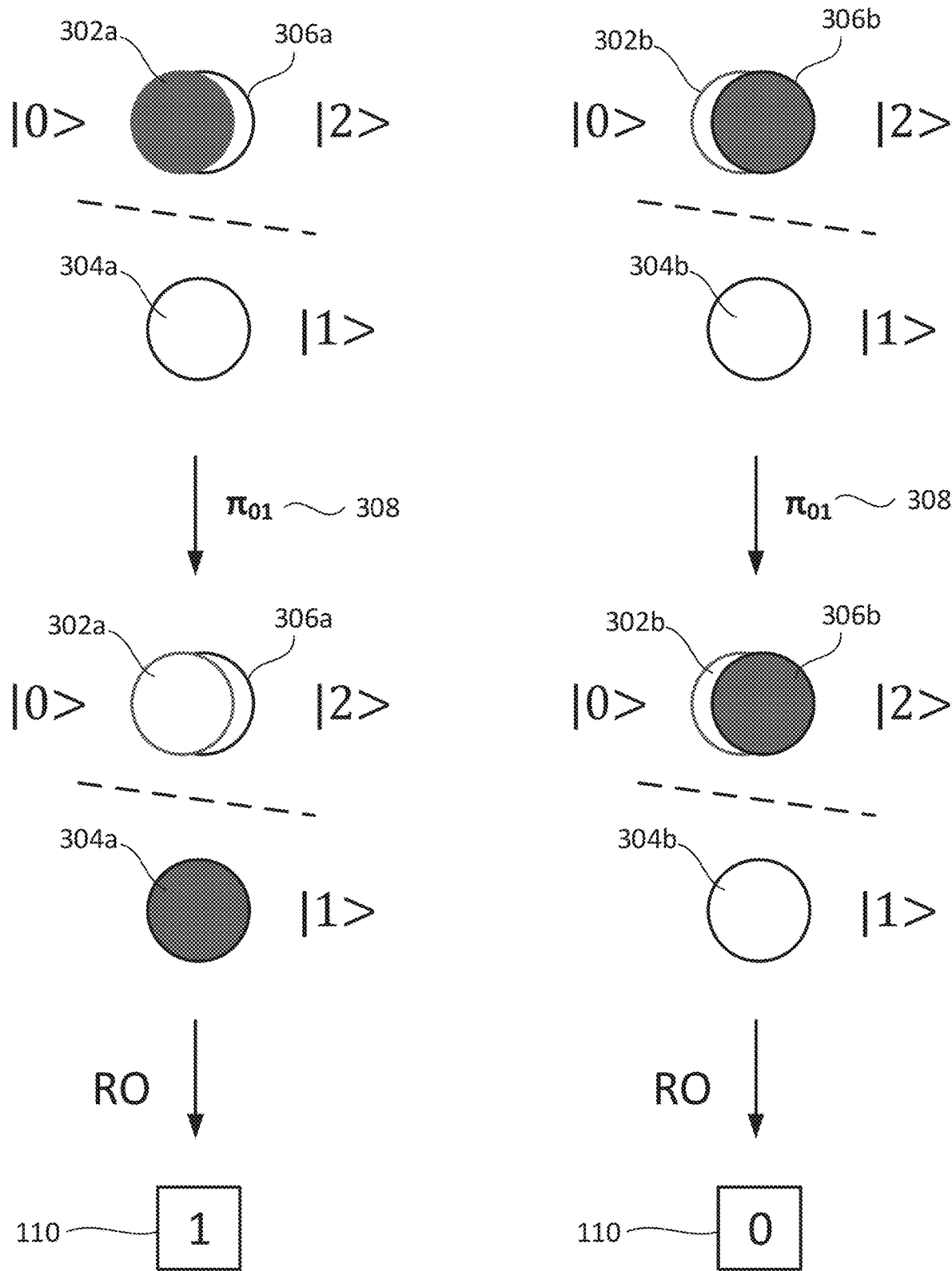
FIG. 3a shows a schematic overview of the application of a shuffling operator/sequence to a qubit.
FIG. 3b shows a schematic overview of the application of a shuffling operator/sequence to a qubit.

FIGS. 3a and 3b show schematic overviews of the application of a shuffling operator/sequence to a qubit. In FIG. 3a, the |0> state of the qubit is occupied. In FIG. 3b, the |2> state of the qubit is occupied. In this example, as with FIGS. 2a and 2b it is assumed that the readout apparatus 110 can only output a value indicative of the qubit state that lies in the computational basis. That is, the readout apparatus 110 cannot provide an output reading of a non-computational basis state.

As in FIGS. 2a and 2b, the state |0> is associated with a first set of measurements 302a, 302b, the state |1> is associated with a second set of measurements 304a, 304b that is disjoint from the first set of measurements 302a, 302b, and the state |2> is associated with a third set of measurements 306a, 306b that at least partially overlaps with the first set of measurements 302a, 302b.

In FIG. 3a, the qubit is initially in the |0> state, as indicated by the shading of the first set of measurements 302a. A shuffling operation 308 is performed on the qubit that swaps the amplitudes of the |0> and |1> states of the qubit. In the example shown, a $\pi_{01}$ pulse is applied to the qubit to exchange the populations of the two states. Following the shuffling operation, the qubit is then in the |1> state, as indicated by the shading of the second set of measurements 304a. Measuring the state of the qubit with the readout apparatus 110 after the shuffle is performed results in an output indicative of the qubit being in the |1> state.

By contrast, in FIG. 3b, the qubit is initially in the |2> state, as indicated by the shading of the third set of measurements 306a. As in FIG. 3a, a shuffling operation 308 is performed on the qubit that swaps the amplitudes of the |0> and |1> states of the qubit. Following the shuffling sequence, the qubit is still in the |2> state. Measuring the state of the qubit with the readout apparatus 110 after the shuffle is performed results in an output indicative of the qubit being in the |0> state.

Thus, the application of a shuffling sequence to the qubit allows the output of the readout apparatus 110 to be used to infer whether the qubit was originally in the |0> or |2> state, despite the readout apparatus being unable to distinguish these two sates from each other. By combining the output of the readout apparatus 110 before the shuffling has been applied with the output of the readout apparatus 110 after the shuffling has been applied, the readout apparatus 110 can be used to determine which of the three states the qubit was originally in.

In general, there may be a plurality of non-computational states available to each qubit, not just the |2> state. For a single qubit with N states, there will be N! distinct shuffling sequences (i.e. distinct resulting re-orderings/permutations of the initial populations). Each shuffling sequence may comprise a sequence of "swapping pulses", each swapping pulse exchanging the population of a pair of qubit states. In some implementations, each shuffling sequence uses only pulses that exchange neighbouring qubit states. In general, assuming that the shuffling sequences only exchange states within the same qubit, for a Q qubit system with $N_q$ states in the $q^{th}$ qubit there will be $\Pi_{q=1}^{Q} N_q!$ distinct shuffling sequences.

For example, in the three-state qubit with states |0>, |1> and |2> described above in relation to FIGS. 2 and 3 there are six distinct shuffling sequences in total corresponding to the six permutations of the original three populations: (i) the identity sequence (i.e. no population exchange, (012)→(012)); (ii)|1><→|2> (i.e. (012)→(021)); (iii) |0><→|1> (i.e. (012)→(102)); (iv) |0><→|1> followed by |1><→|2> (i.e. (012)→(120)); (v) |1><→|2> followed by |0><→|1> (i.e. (012)→(201)); and (vi) |0><→|1> followed by |1><→|2> then |0><→|1> (i.e. (012)→(210)).

In some implementations only a subset of the total distinct shuffling sequences are required to discriminate between the states. For example, in the embodiment described above, only two of the six available shuffling sequences are required to distinguish the states, i.e. there is a minimum number of shuffling sequences required to distinguish the states. In some implementations, more than the minimum number of shuffling sequences may be used in order to provide more information. In general, M shuffling sequences are used, where M≤N! in the single qubit case. The minimum number of sequences given N qubit states and R readout states is the ceiling of (N−1)/(R−1). For example, when R=2 and N=3 (such as in the example in FIGS. 2 and 3), at least two shuffling sequences are required. However, depending on the readout apparatus used, some shuffling sequences may not be helpful in distinguishing the states. For example, in FIGS. 2 and 3, a shuffle sequence exchanging the |0> and |2> states would not provide any additional information that would allow the states to be distinguished. In some embodiments, the system/method should include enough sequences to provide a good contrast, regardless of how the non-computational states are resolved by the measurement apparatus.

In embodiments where multiple subsets of shuffling sequences are suitable for distinguishing the qubit states, the subset used may be selected to minimise the length of the longest sequence of population exchanges/swapping pulses. This may increase the fidelity of the resulting population measurements, since fidelity will decrease with the number of applied swapping pulses. For example, in the embodiment described above with three qubit states, sequence (vi) uses three swapping pulses, so the subset of shuffling sequences may be chosen to exclude this sequence.

Figure 4:
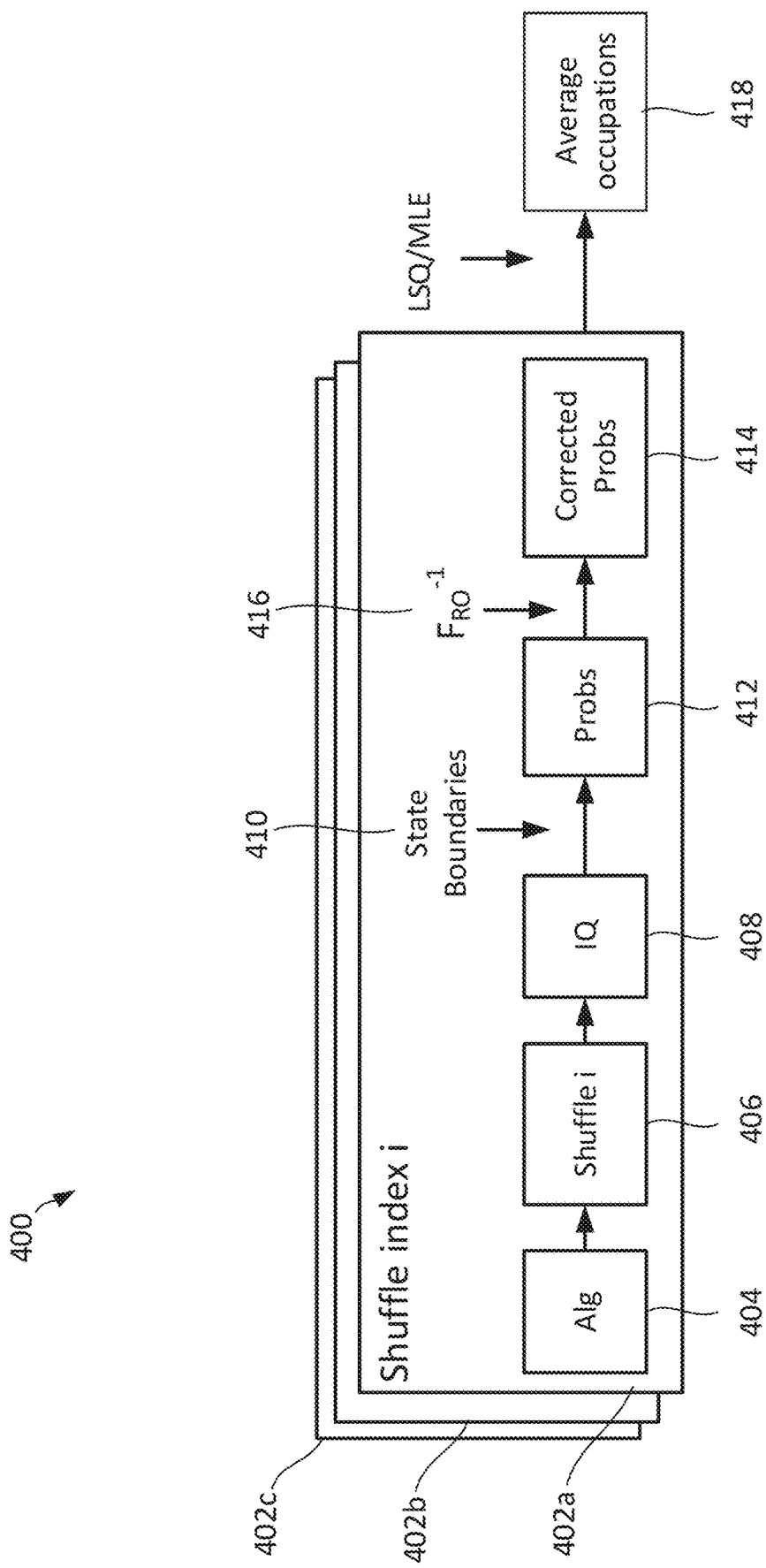
FIG. 4 shows a schematic overview of an example method for determining average occupation of quantum states of one or more qubits in a quantum computer after the execution of a quantum algorithm.

FIG. 4 shows a schematic overview of an example method for determining average occupation of quantum states of one or more qubits in a quantum computer after the execution of a quantum algorithm. The average occupations/probabilities of the quantum states may be given by the diagonal components of the density matrix ρ of the system.

For each shuffle sequence 402a-c, a quantum algorithm 404 is applied to the one or more qubits, followed by shuffle sequence i 406 from a set of M shuffling sequences. Applying a quantum algorithm 404 comprises applying a sequence of quantum gates to one or more qubits prepared in a known initial state. The sequence of quantum gates may, for example, comprise a sequence of one qubit and/or two qubit quantum gates.

Following application of the quantum algorithm 404 and the shuffling sequence, measurements are performed on the one or more qubits to generate measurement data 408. State boundaries in measurement space 410 are used to generate initial probabilities 412 of the one or more qubits being in the available (multi-)qubit states for the shuffling operation 402a from the measurement data 408. Here, the measurement data is shown as being measurements in the I-Q plane, though it may alternatively be any measurement data.

In some embodiments, the execution of the quantum algorithm 404, shuffling 406, and measurements 408 are performed a plurality of times for each shuffling operation in order to determine the initial probabilities 412 of the one or more qubits being in each state. For each shuffling sequence, s, the number of times, $R_{ms}$, each potential readout measurement, m, is obtained from the plurality of times that sequence is applied is determined. In other words, $R_{ms}$ is the number of times result m is obtained by the readout device after applying sequence s a plurality of times, $N_s$.

In some embodiments, corrected probabilities 414 are generated from the initial probabilities 412 using a readout fidelity 416 (denoted $F_{RO}$ in this example). The readout fidelity 416 encodes errors in the readout apparatus. For example, if the qubits are prepared in a known state, the readout fidelity 416 gives the probability of the readout apparatus giving each of the possible readout states when the state is measured. Using the readout fidelity 416 and the initial probabilities 412, probabilities in the absence of readout errors can be inferred. The generation of corrected probabilities 414 may, in some embodiments, be performed separately for each shuffling sequence.

The average occupations 418 for the quantum state of the one or more qubits after execution of the quantum algorithm 404 are inferred from the initial probabilities 412 or, if corrected probabilities have been determined, from the corrected probabilities 414. The average occupations 418 may, in some implementations, be determined using a least squares method or a maximum likelihood estimate based on a calibration process, as described below. In other implementations, the initial probabilities 412 or the corrected probabilities 414 may be taken for the average occupations 418.

Once the average populations/occupations 418 of the states have been determined, the leakage of the quantum system can be determined based on the determined average populations/occupations 418. For an ideal system, application of the quantum algorithm 404 to the one or more qubits prepared in a state in the computational subspace should result in a final state that is in the computational subspace. However, leakage into states outside the computation subspace can occur in non-ideal systems. Reducing this leakage is a goal of qubit/gate calibration.

A comparison of the determined average populations/occupations 418 of states in the computational subspace to the determined average populations/occupations 418 of states in the non-computational subspace can be used to determine a leakage. The leakage may be used as a loss function to optimise parameters of the system in order to calibrate the system, such as control parameters of the quantum gates used to apply the quantum algorithm.

Examples of parameters which may be optimised include qubit frequency, qubit anharmonicity, pi pulse length, pi/2 pulse length, pi pulse amplitude, pi/2 pulse amplitude, readout pulse frequency, readout pulse length, and readout pulse power. Multi-qubit gate parameters, such as two-qubit gate parameters, may alternatively or additionally be optimised, for example qubit frequencies during two-qubit gates, coupling during two-qubit gates, and/or two-qubit gate length.

Calibrating a qubit may comprise varying hardware parameters of the system, measuring the response of the system, and using the measured results to obtain values for one or more qubit parameters. It will be understood that as used herein, the term "qubit parameter" refers to any parameter associated with a qubit, including qubit control parameters relating to e.g. qubit control and/or measurement hardware.

In some embodiments, a readout calibration process (distinct from the qubit calibration described above) may be performed to determine calibration results that may be used to calibrate the readout apparatus output. The results of the calibration can be used when determining the average populations in order to account for inaccuracies in the readout apparatus/leakage in the shuffling sequence, resulting in more accurate population measurements.

Each of the M shuffling sequences is applied a plurality of times to one or more qubits prepared in a known initial state. After application of each sequence, s, the state of the one or more qubits is measured using the readout apparatus. The one or more qubits are then reset to the known initial state, and the shuffling sequence is applied again, followed by another measurement of the state of the one or more qubits using the readout apparatus. From the measurements, a fraction of readout states for each potential output is obtained for each sequence starting from the known initial state.

The process is repeated for each known initial state in order to generate a calibration tensor, $C_{msq}$, for the system. The components of $C_{msq}$ are the probability to obtain result m from the readout apparatus after application of shuffling sequence s to known initial state |q⟩. The measurement results and initial states may correspond to single qubit states (e.g. |0⟩, |1⟩, |2⟩ etc.) or multi-qubit states (e.g. |00⟩, |01⟩, |002⟩ etc.).

As an example, consider the three state system illustrated above in relation to FIGS. 2 and 3 with a readout apparatus capable of providing a readout indicative of only |0⟩ or |1⟩ states. First, for the qubit prepared in the state |0⟩, all M shuffling sequences are each applied many times to the qubit, and for each sequence, s, the fraction $C_{s0}$ of a specific result of the 0/1 measurement (say, for example, result "1") is determined. After that, all sequences are applied many times to the initial state |1⟩ to obtain the fractions $C_{s1}$. This is then repeated for the initial state |2⟩ to obtain the fractions $C_{s2}$. This gives an M×3 calibration matrix $C_{sq}$ where the first index s denotes a particular shuffling sequence, while the second index q denotes the initial qubit state |q⟩.

As the readout apparatus is capable of only providing a readout indicative of a |0⟩ or |1⟩ state, the probability of obtaining the other measurement (in this case "0") for each sequence, s, and initial state, q, is given by $1-C_{sq}$.

In systems where the shuffling sequences are nearly ideal and fast (i.e. with negligible decoherence), a simplified calibration procedure may alternatively be used. Instead of measuring the readout probabilities for all M sequences starting from each state, it is sufficient to determine the readout measurements for each initial state without applying the shuffling sequences, and inferring the results for each sequence. For example, in the three-state system described above in relation to FIGS. 2 and 3, the 0/1 measurements are taken using the readout apparatus after preparation of the qubit in the known initial state. Taking the identity shuffling sequence to be s=0, the calibration tensor row for the sequence is given by $C_{0q}$. From this, the other calibration tensor components can be inferred using a "shuffle tensor", $T_{sq_fq_i}$, which consists of 0s and 1s such that $T_{sq_fq_i}=1$ iff shuffle sequence s moves initial state |$q_i$⟩ to final state |$q_f$⟩. Using this shuffle tensor, the calibration tensor can be given as:

$$C_{sq} = \sum_{q_f} C_{0q_f} T_{sq_f q}.$$

This result generalises to the case of more than two readout states (e.g. where the readout apparatus provides output corresponding to three or more states, such as in a multi-qubit system) by inclusion of the additional index m in $C_{sq}$. Using the shuffling tensor, the calibration tensor may then be given by:

$$C_{msq} = \sum_{q_f} C_{m0q_f} T_{sq_f q}$$

The calibration results can be used to determine the average populations for each state, $\rho_q$, from the (potentially corrected) readout measurements using a population equation:

$$\frac{R_{ms}}{N_s} = \sum_q C_{msq}\rho_q,$$

where $N_s$ is the number of times sequence s is applied and $R_{ms}$ is the number of times measurement result m is obtained from the readout apparatus when applying sequence s. In some implementations, $N_s$ is the same for each shuffling sequence, s.

This equation can be solved, together with the constraints that the average populations are normalised, $$\sum_q \rho_q = 1,$$

and that the average population of each state is non-negative and less than or equal to one, i.e. $0 \leq \rho_q \leq 1$, to provide the average probabilities. A number of methods may be used to solve these equations, as described below.

In some embodiments, the combination of choice of M, the available readout states and the total number of quantum states may result in the set of equations and constraints described above providing an overdetermined set of equations. These will not in general have an exact solution. An approximate solution for the average populations, $\rho_q$, can be found in a number of different ways, such as using matrix pseudoinverse methods (e.g. the least squares method) or a maximum likelihood method.

In relation to pseudoinverse method, applying a pseudo-inverse of $C_{msq}$ may result in average populations not satisfying the normalisation condition. In some implementations, an additional procedure may be used to enforce this constraint. One example is the use of Lagrange multipliers. Alternatively, one of the average populations, $\rho_n$, may be eliminated as a variable using the normalisation condition, e.g.

$$\rho_n = 1 - \sum_{q \neq n} \rho_q$$

and the equations rewritten in terms of a reduced calibration matrix, $\tilde{C}$, for example:

$$\tilde{C}_{msq} = C_{msq} - C_{msn}.$$

The population equation then becomes:

$$R_{sms}/N_s - C_{msn} = \sum_{q \neq n} \tilde{C}_{msq}\rho_q$$

which can be solved using pseudoinverse methods to obtain the average populations for $q \neq n$. The process may be repeated for one or more different values of n in order to check that the same results are given in each case.

Furthermore, pseudoinverse methods may not guarantee that the average population lies between zero and one. An ad-hoc procedure may be used to enforce this constraint, such as resetting negative populations to zero and/or resetting populations greater than one to one and then renormalizing $\rho_q$. Alternatively, when using a least squares deviation approach to solve the calibration equation, $0 \leq \rho_q \leq 1$ can be used as a constraint. Note that accuracy of the solution can be estimated by varying p q around the solution point and checking the increase of the deviation $\Sigma_q(R_{ms}/N_s - C_{msq}\rho_q)^2$; increase by a predetermined factor, e.g. a factor of 2, can be used as an error bar.

In some implementations, a maximum likelihood method is used to solve the population equation. In this method, for a given set of populations $\{\rho_0, \rho_1 \ldots \rho_n\}$ a likelihood function is defined, and then maximized over the values $\{\rho_0, \rho_1 \ldots \rho_n\}$ within the constraints of normalisation and $0 \leq \rho_q \leq 1$.

As an example, consider the three-state, single qubit system described in relation to FIGS. 2 and 3. For a sequence s, the probability of measuring the chosen result (e.g. "1" in this case) with the readout apparatus is $\Sigma_q C_{sq}\rho_q$. For $N_s$ runs of sequence s, the expected number of "clicks" (i.e. instances of the chosen result, 1, being output by the readout apparatus) will be given by:

$$R_s^{theor} = N_s \sum_q C_{sq}\rho_q \pm \sqrt{V_s}$$

where the variance $V_s$ is given by:

$$V_s = N_s\left(\sum_q C_{sq}\rho_q\right)\left(1 - \sum_q C_{sq}\rho_q\right).$$

A probability distribution may then be used to define a likelihood function. For example, assuming the Gaussian distribution, the probability of obtaining the experimental number $R_s$ of clicks is $$P_s = \frac{1}{\sqrt{2\pi V_s}}\exp\left[-\frac{\left(R_s - N_s\sum_q C_{sq}\rho_q\right)^2}{2V_s}\right].$$

Taking the product $P = \Pi_s P_s$ of probabilities for all M sequences can result in an overall probability distribution for the clicks. This overall probability distribution can be used to define the likelihood function. In some implementations, a log-likelihood function may be used, though other likelihood functions are possible. For example, using the Gaussian probability distribution above and using only the exponential factors of the Gaussians, the log-likelihood $$\ln P \simeq -\sum_s \frac{\left(R_s/N_s - \sum_q C_{sq}\rho_q\right)^2}{2V_s/N_s} N_s.$$

Taking the likelihood function and maximising over p q gives the average populations. Numerical optimisation techniques, such as gradient ascent or package solvers (for example CVX, SEDUMI, YALMIP, SDPD$_3$), may be used to maximise the likelihood function.

Note that in this example, V$_s$ is also a function of $\rho_q$. This can complicate the maximisation of the likelihood function. In some implementations, an experimental value of the variance may alternatively be used to simplify the calculations. In these implementations the variance is given by:

$$V_s = N_s(R_s/N_s)(1-R_s/N_s).$$

In some implementations, an extra phenomenological factor can be introduced to the variance, giving $$V_s = N_s(R_s/N_s)(1-R_s/N_s) + \alpha N_s$$

where $\alpha \geq 0$ is a phenomenological parameter. For example, a may lie in the range (0,1), such as within the range (0.01, 0.5), such as 0.1.

The maximum likelihood method can be generalised to the case of more than one qubit. For a sequence s, the probability of measuring a particular result, m, with the readout apparatus is $\Sigma_q C_{msq} \rho_q$. The maximum likelihood method maximises the probability of the measured results over the average populations, $\rho_q$. The probability of a particular set of results may be given by:

$$P = \prod_{s=1}^{M}\left[\frac{N_s!}{\prod_{m=1}^{N_{RO}} R_{ms}!}\prod_{m=1}^{N_{RO}}\left(\sum_{q=1}^{N_Q} C_{msq}\rho_q\right)^{R_{ms}}\right]$$

where M is the number of distinct shuffling sequences, N$_s$ is the number of times sequence s is applied, N$_{RO}$ is the number of readout states and N$_Q$ is the number of states of the qubits. Using a log-likelihood function, and ignoring constant terms, the likelihood to be maximised is given by:

$$\ln P - const = \sum_s\sum_m N_s \frac{R_{ms}}{N_s}\ln\left(\sum_q C_{msq}\rho_q\right).$$

This is closely related to the cross-entropy.

In some implementations, this expression can be simplified by dividing $\Sigma_q C_{msq}\rho_q$ by $R_{ms}/N_s$ (which does not depend on $\{\rho_q\}$ and therefore does not affect the optimization) and then expanding the logarithm to the second order around 1. First order terms cancel to give the likelihood function:

$$\ln P - const = \sum_s\sum_m \frac{\left(R_{ms}/N_s - \sum_q C_{msq}\rho_q\right)^2}{R_{ms}/N_s + a}N_s$$

where the phenomenological parameter a has again been introduced, which interpolates between the Maximum Likelihood and Least Squares. Note that when N$_{RO}$=2 and R$_{0s}$=N$_s$−R$_{1s}$, this reduces to the single qubit, two-readout state described above.

Taking the likelihood function and maximising over $\rho_q$ gives the average populations. Numerical optimisation techniques, such as gradient ascent or package solvers (for example CVX, SEDUMI, YALMIP, SDPT$_3$), may be used to maximise the likelihood function.

A straightforward method for maximizing the likelihood function is linear inversion with the normalization constraint on the average populations. This method does not guarantee $0 \leq \rho_q \leq 1$; if this happens, an ad-hoc adjustment should be done as described above. The cost function $$C = \sum_m\sum_s\left(A_{ms} - \sum_m B_{msq}\rho_q\right)^2$$

$$A_{ms} = \sqrt{\frac{N_s}{2R_{ms}/N_s + a}}\frac{R_s}{N_s},\ B_{msq} = \sqrt{\frac{N_s}{2R_{ms}/N_s + a}}C_{msq}$$

is minimised subject to the constraint on the normalisation of the average populations. Incorporating the constraint may be achieved using Lagrange multipliers, resulting in another cost function:

$$\tilde{C} = C + 2\lambda\left(\sum_q \rho_q - 1\right)$$

To determine the unknowns (i.e. $\rho_q$ and $\lambda$) the point satisfying the equations $\partial\tilde{C}/\partial\rho_q=0$ and the equation $\partial\tilde{C}/\partial\lambda=0$ is found. These equations provide the correct number of equations for the number of unknown results, giving:

$$\sum_{q'}(D_{qq'}\rho_{q'}) + \lambda = E_q,\ \sum_q \rho_q = 1$$

$$D_{qq'} = \sum_m\sum_s B_{msq}B_{msq'},\ E_q = \sum_m\sum_s A_{ms}B_{msq}$$

To find $\rho_q$, the (N+1)×(N+1) matrix $\tilde{D}$ is inverted which coincides with D in the N×N block, has 0 as Nth diagonal element, and has is as the remaining elements in the (N+1)th row and (N+1)th column.

Figure 5:
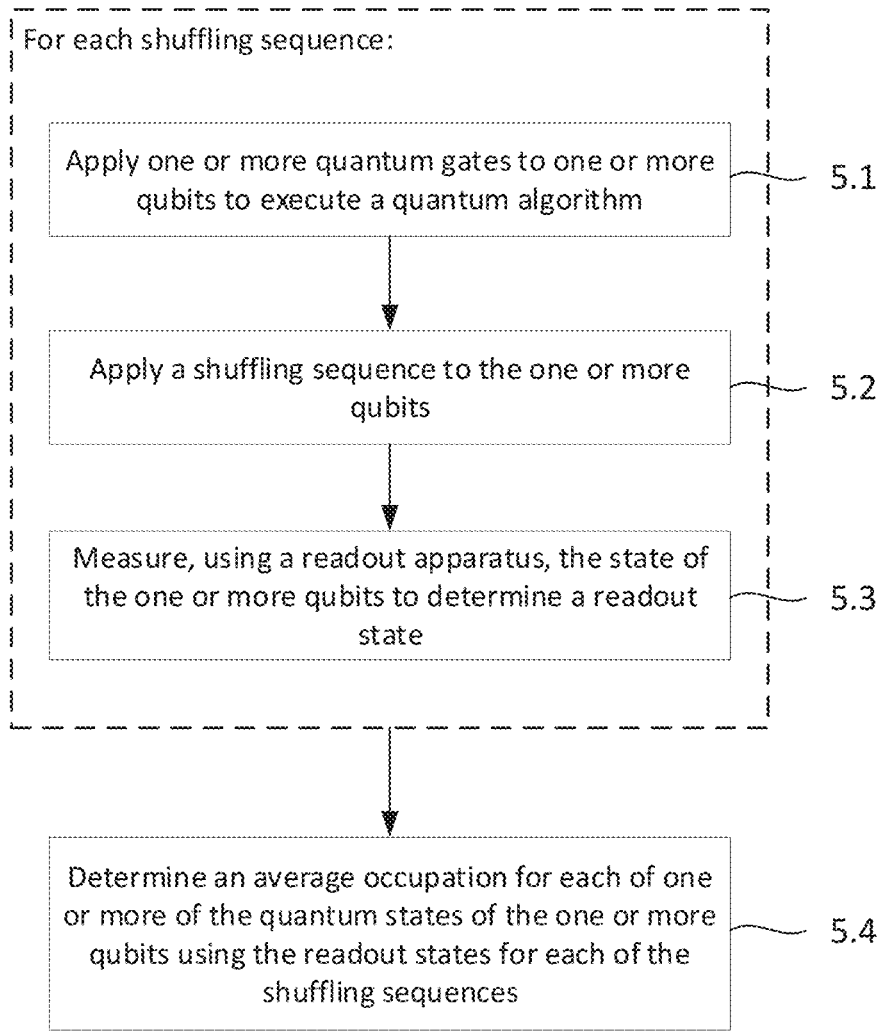
FIG. 5 shows a flow chart of an example method for determining average occupation of quantum states of one or more qubits in a quantum computer.

FIG. 5 shows a flow chart of an example method for determining average occupation of quantum states of one or more qubits in a quantum computer. The method may be performed by a system comprising quantum and classical computing apparatus, such as the system described in relation to FIG. 1. Operations 5.1 to 5.3 are performed for each shuffling sequence in a plurality of shuffling sequences. In some implementations, operations 5.1 to 5.3 are iterated multiple times for each shuffling sequence.

At operation 5.1, a quantum algorithm is executed on the one or more qubits. Executing the quantum algorithm may comprise applying one or more quantum gates to the one or more qubits. The qubits may be prepared in the same initial state for each iteration of the method. Alternatively, the qubits may be prepared in different states. For example, when performing a calibration, it may be desirable to prepare the qubits in a different known initial state for some iterations.

At operation 5.2, a shuffling sequence is applied to the one or more qubits. One or more of the shuffling sequences acts to exchange the populations of two or more states in the qubits. The shuffling sequences may also comprise an identity sequence, in which no shuffling is performed—i.e. the amplitudes of the quantum states of the one or more qubits are not exchanged after the execution of the quantum algorithm.

At operation 5.3, readout apparatus is used to measure the state of the one or more qubits to determine a readout state. The readout apparatus performs physical measurements on the one or more qubits. The physical measurements are used to infer a readout state for the one or more qubits, for example using state boundaries in a measurement space.

The readout apparatus is only capable of outputting data indicating that the one or more qubits are in a state from a proper subset of the available quantum states. In some embodiments, this proper subset of states comprises the computational states/subspace of the one or more qubits—e.g. |0> or |1> for a single qubit, |00>, |01>, |10> or |11> for two qubits etc.

At operation 5.4, an average occupation for each of one or more of the quantum states on the qubits is determined using the readout states for each of the shuffling sequences. The average occupations may, in some implementations, be determined using a least squares method or a maximum likelihood estimate.

Figure 6:
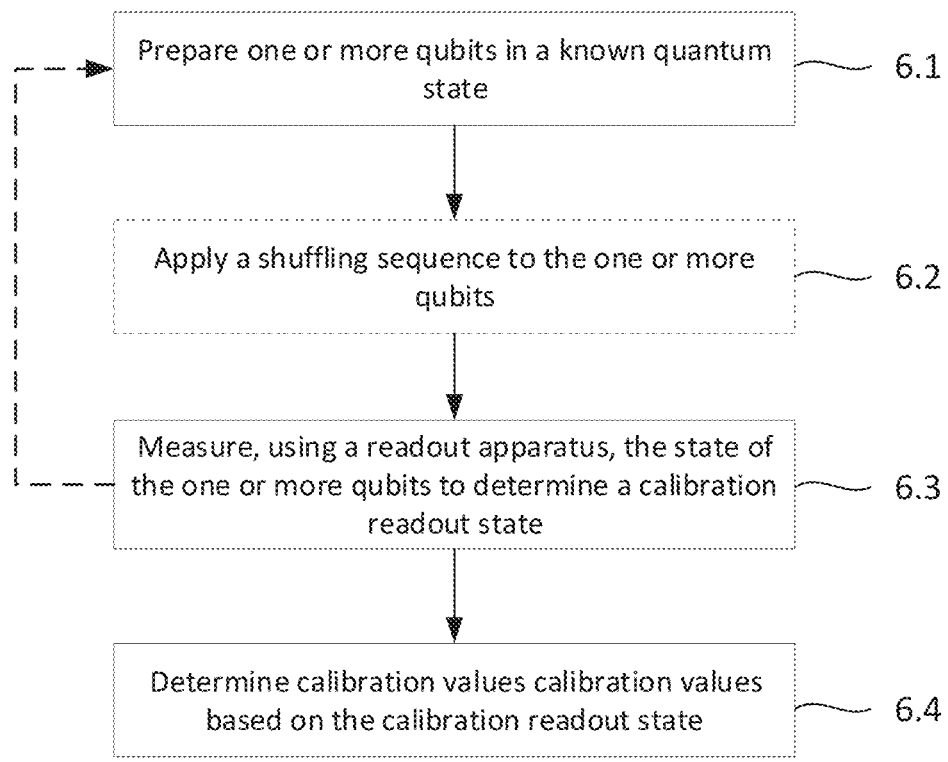
FIG. 6 shows a flow chart of an example method for determining calibration values of the quantum computing system.

FIG. 6 shows a flow chart of an example method for determining calibration values of the quantum computing system. Such calibration values allow non-ideal behaviour in the readout apparatus and/or shuffling sequences to be accounted for when determining the average populations. The method may be performed by a system comprising quantum and classical computing apparatus, such as the system described in relation to FIG. 1. In some implementations, operations 6.1 to 6.3 are performed for each shuffling sequence in a plurality of shuffling sequences. However, in some implementations, no shuffling sequences (i.e. only the identity sequence) are applied.

At operation 6.1, one or more qubits are prepared in a known initial state, q.

In some implementations, a shuffling sequence is applied to the one or more qubits at operation 6.2. However, in implementations where the shuffling sequences are nearly ideal and fast (i.e. with negligible decoherence), operation 6.2 may be omitted.

At operation 6.3, readout apparatus is used to measure the state of the one or more qubits to determine a calibration readout state.

Operations 6.1 to 6.3 may be iterated for each possible initial state of the one or more qubits (e.g. |0>, |1>, |2> etc. for a single qubit). That is, for each potential initial state, operations 6.1 to 6.3 may be performed multiple times to determine a set of calibration readout states for each initial state.

At operation 6.4, calibration values are determined based on the calibration readout states. The calibration values may comprise a fraction of calibration readout states obtained in each potential readout state given an initial quantum state (i.e. $C_{m0q}$). Calibration values for each shuffling sequence (i.e. $C_{msq}$) may then be determined by applying a shuffling tensor, T, to these values.

Where shuffling sequences have been applied at operation 6.2, the calibration values may comprise a fraction of calibration readout states obtained in each potential readout state given an initial quantum state and a particular shuffle sequence (i.e. $C_{msq}$).

The calibration values, $C_{msq}$, can be used to determine the average populations of each quantum state, for example using a least squares method or maximum likelihood method, as described above.

A number of implementations have been described. Nevertheless, it will be understood that various modifications may be made without departing from the spirit and scope of the invention. Other implementations are within the scope of the following claims.

Implementations of the digital and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for determining an average occupation of quantum states of a plurality of qubits in a quantum computer, each qubit being subject to a set of quantum states that includes at least three quantum states, the method comprising:
   performing, by the quantum computer, a plurality of shuffling sequences on the plurality of qubits, wherein each shuffling sequence of the plurality of shuffling sequences includes measuring the quantum state of each qubit of the plurality of qubits subsequent to exchanging the quantum state of at least two qubits of the plurality of qubits; and
   subsequent to performing the plurality of shuffling sequences, determining, by a classical computer or the quantum computer, an average occupation for each quantum state of the set of quantum states based on the measured quantum state of each qubit of the plurality of qubits of each shuffling sequence of the plurality of shuffling sequences.

2. The method of claim 1, wherein each shuffling state of the plurality of shuffling states comprises:
   applying, by the quantum computer, one or more quantum gates to the one or more qubits to execute a quantum algorithm;
   applying, by the quantum computer, a shuffling sequence to the one or more qubits; and
   measuring, using a readout apparatus of the quantum computer, the quantum state of each qubit of the plurality of qubits to determine a readout state.

3. The method of claim 2, wherein determining the average occupation for each quantum state of the set of quantum states is further based on qubits using the readout states for each of the shuffling sequences.

4. The method of claim 2, wherein the readout states of each shuffling sequence of the plurality of shuffling sequences corresponds to a state in the set of the quantum states.

5. The method of claim 2, wherein the readout state of each of the plurality of shuffling sequences corresponds to a state in a computational subspace.

6. The method of claim 1, wherein the plurality of shuffling sequences comprises one or more sequences for exchanging the population of two or more quantum states in the one or more qubits.

7. The method of claim 1, wherein the plurality of shuffling sequences comprises an identity sequence.

8. The method of claim 1, the method further comprising determining, by the classical computer or the quantum computer, leakage from computational states of the plurality of qubits to non-computational states of the plurality of qubits using the average occupation for each quantum state of the set of quantum states.

9. The method of claim 8, the method further comprising adjusting, based on the determined leakage, control parameters of the set of quantum gates to reduce leakage from computational states of the plurality of qubits to non-computational states of the plurality of qubits.

10. The method of claim 1, wherein the method further comprises:
    preparing the plurality of qubits in a known quantum state of the set of quantum states;
    measuring, using a readout apparatus of the quantum computer, the quantum state of each qubit of the plurality of qubits to determine a calibration readout state; and
    determining, by the classical computer or the quantum computer, calibration values based on the calibration readout state,
    wherein determining an average occupation for one or more of the quantum states of the plurality of qubits is further based on the calibration values.

11. The method of claim 10, wherein the method further comprises:
    for each of the plurality of shuffling sequences:
      preparing the plurality of qubits in a known quantum state of the set of quantum states;
      applying, by the quantum computer, a shuffling sequence to plurality of qubits; and
      measuring, using a readout apparatus, the quantum state of each qubit of the plurality of qubits to determine a further calibration readout state,
    wherein determining the calibration values is further based on the further calibration values.

12. The method of any of claim 10, wherein determining the average occupation for each quantum state of the set of quantum states comprises the use of a least squares method or a maximum likelihood method.

13. The method of claim 1, wherein performing each shuffling sequence of the plurality of shuffling sequences comprises applying one or more microwave pulses to the plurality of qubits.

14. The method of claim 13, wherein the one or more microwave pulses each exchanges amplitudes of neighbouring quantum states of the plurality of qubits.

15. A system comprising:
    a plurality of qubits, each qubit of the plurality of qubits being subject to a set of quantum states that includes at least three quantum states;
    readout apparatus configured to measure a quantum state of the plurality of qubits;
    wherein the system is configured to:
      perform a plurality of shuffling sequences on the plurality of qubits, wherein each shuffling sequence of the plurality of shuffling sequences includes employing the readout apparatus to measure the quantum state of each qubit of the plurality of qubits subsequent to exchanging the quantum state of at least two qubits of the plurality of qubits; and subsequent to performing the plurality of shuffling sequences, determine an average occupation for each quantum state of the set of quantum states based on the measured quantum state of each qubit of the plurality of qubits of each shuffling sequence of the plurality of shuffling sequences.

16. The system of claim 13, wherein each shuffling state of the plurality of shuffling states comprises:

applying, by the quantum computer, one or more quantum gates to the one or more qubits to execute a quantum algorithm;

applying, by the quantum computer, a shuffling sequence to the one or more qubits; and measuring, using a readout apparatus of the quantum computer, the quantum state of each qubit of the plurality of qubits to determine a readout state.

17. The system of claim 16, wherein determining the average occupation for each quantum state of the set of quantum states is further based on qubits using the readout states for each of the shuffling sequence.

18. The system of claim 16, wherein the readout states of each shuffling sequence of the plurality of shuffling sequences corresponds to a state in the set of the quantum states.

19. The system of claim 16, wherein the readout state of each of the plurality of shuffling sequences corresponds to a state in a computational subspace.

20. The system of claim 15, wherein the plurality of shuffling sequences comprises one or more sequences for exchanging the population of two or more quantum states in the one or more qubits as currently presented appears below.

* * * * *